(12) United States Patent
El-Khamy et al.

(10) Patent No.: US 10,679,351 B2
(45) Date of Patent: Jun. 9, 2020

(54) SYSTEM AND METHOD FOR SEMANTIC SEGMENTATION OF IMAGES

(71) Applicant: Samsung Electronics Co., Ltd., Yongin-si, Gyeonggi-do (KR)

(72) Inventors: Mostafa El-Khamy, San Diego, CA (US); Zhizhong Li, Urbana, IL (US); Jungwon Lee, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 15/862,602

(22) Filed: Jan. 4, 2018

(65) Prior Publication Data
US 2019/0057507 A1 Feb. 21, 2019

Related U.S. Application Data

(60) Provisional application No. 62/547,740, filed on Aug. 18, 2017.

(51) Int. Cl.
*G06K 9/34* (2006.01)
*G06T 7/11* (2017.01)
(Continued)

(52) U.S. Cl.
CPC ............ *G06T 7/11* (2017.01); *G06K 9/00664* (2013.01); *G06K 9/4604* (2013.01);
(Continued)

(58) Field of Classification Search
CPC ... G06T 7/11; G06T 7/70; G06T 11/60; G06T 5/20; G06K 9/6274; G06K 9/00664;
(Continued)

(56) References Cited

U.S. PATENT DOCUMENTS 8,897,578 B2  11/2014  Huang et al.
2008/0164985 A1  7/2008  Iketani et al.
(Continued)

FOREIGN PATENT DOCUMENTS

CN  106372577 A  2/2017
JP    6050223 B2  12/2016
(Continued)

OTHER PUBLICATIONS

K. He et al., "Mask R-CNN," *Proceedings of the IEEE International Conference on Computer Vision*, 2017, pp. 2961-2969.
(Continued)

*Primary Examiner* — Andrew M Moyer
(74) *Attorney, Agent, or Firm* — Lewis Roca Rothgerber Christie LLP

(57) ABSTRACT

Detecting objects in an image includes: extracting core instance features from the image; calculating feature maps at multiscale resolutions from the core instance features; calculating detection boxes from the core instance features; calculating segmentation masks for each detection box of the detection boxes at the multiscale resolutions of the feature maps; merging the segmentation masks at the multiscale resolutions to generate an instance mask for each object detected in the image; refining the confidence scores of the merged segmentation masks by auxiliary networks calculating pixel level metrics; and outputting the instance masks as the detected objects.

26 Claims, 9 Drawing Sheets
(6 of 9 Drawing Sheet(s) Filed in Color)

(51) Int. Cl.
  *G06K 9/72* (2006.01)
  *G06K 9/46* (2006.01)
  *G06N 3/08* (2006.01)
  *G06T 11/60* (2006.01)
  *G06T 5/20* (2006.01)
  *G06K 9/66* (2006.01)
  *G06T 7/70* (2017.01)
  *G06K 9/62* (2006.01)
  *G06K 9/00* (2006.01)
  *G06N 3/04* (2006.01)

(52) U.S. Cl.
  CPC ............. *G06K 9/6274* (2013.01); *G06K 9/66* (2013.01); *G06K 9/726* (2013.01); *G06N 3/0454* (2013.01); *G06N 3/08* (2013.01); *G06N 3/084* (2013.01); *G06T 5/20* (2013.01); *G06T 7/70* (2017.01); *G06T 11/60* (2013.01); *G06N 3/0445* (2013.01); *G06T 2207/20016* (2013.01)

(58) Field of Classification Search
  CPC ........ G06K 9/66; G06K 9/726; G06K 9/4604; G06N 3/08
  USPC ......................................................... 382/173
  See application file for complete search history.

(56) References Cited

U.S. PATENT DOCUMENTS

| | | | |
|---|---|---|---|
| 2016/0358337 | A1 | 12/2016 | Dai et al. |
| 2016/0358338 | A1 | 12/2016 | Tsunoda |
| 2017/0109625 | A1* | 4/2017 | Dai .......................... G06N 3/08 |
| 2017/0206431 | A1 | 7/2017 | Sun et al. |
| 2018/0253622 | A1* | 9/2018 | Chen .................... G06N 3/0454 |

FOREIGN PATENT DOCUMENTS

| | | |
|---|---|---|
| JP | 2017-5389 A | 1/2017 |
| WO | WO 2016/037300 A1 | 3/2016 |

OTHER PUBLICATIONS

Y. Li et al., "Fully Convolutional Instance-aware Semantic Segmentation," *Proceedings of the IEEE Conference on Computer Vision and Pattern Recognition*, 2017, pp. 2359-2367.

M. Bai et al., "Deep Watershed Transform for Instance Segmentation," *Proceedings of the IEEE Conference on Computer Vision and Pattern Recognition*. 2017, pp. 5221-5229.

B. Hariharan et al., "Semantic Contours from Inverse Detectors," *International Conference on Computer Vision*. IEEE, 2011, 8 pages.

T.-Y. Lin et al., "Microsoft COCO: Common Objects in Context," *European Conference on Computer Vision*. Springer, Cham, 2014, pp. 1-15.

M. Everingham et al., "The Pascal Visual Object Classes Challenge: A Retrospective," *International Journal of Computer Vision*, 111.1 (2015): 98-136.

M. Cordts et al., "The Cityscapes Dataset for Semantic Urban Scene Understanding," *Proceedings of the IEEE Conference on Computer Vision and Pattern Recognition*. 2016, pp. 3213-3223.

T.-Y. Lin et al., "Feature Pyramid Networks for Object Detection," *Proceedings of the IEEE conference on computer vision and pattern recognition*. 2017, pp. 2117-2125.

S. Xie et al., "Aggregated Residual Transformations for Deep Neural Networks," *Proceedings of the IEEE Conference on Computer Vision and Pattern Recognition*. 2017, pp. 1492-1500.

H. Zhao et al., "Pyramid Scene Parsing Network," *Proceedings of the IEEE conference on computer vision and pattern recognition*. 2017, pp. 2881-2890.

J. Dai et al., "Instance-aware Semantic Segmentation via Multi-task Network Cascades," *Proceedings of the IEEE Conference on Computer Vision and Pattern Recognition*, 2016 pp. 3150-3158.

X. Liang et al., "Proposal-free Network for Instance-level Object Segmentation," *IEEE transactions on pattern analysis and machine intelligence* 40.12 (2017): 2978-2991.

A. Arnab et al., "Pixelwise Instance Segmentation with a Dynamically Instantiated Network," *Proceedings of the IEEE Conference on Computer Vision and Pattern Recognition*, 2017, pp. 441-450.

S. Zheng et al., "Conditional Random Fields as Recurrent Neural Networks." *Proceedings of the IEEE International Conference on Computer Vision*, 2015, pp. 1529-1537.

P.O. Pinheiro et al., "Learning to Refine Object Segments." *European Conference on Computer Vision*. Springer, Cham, 2016, 18 pages.

B. Hariharan et al., "Hypercolumns for object segmentation and fine-grained localization." *Proceedings of the IEEE Conference on Computer Vision and Pattern Recognition*, 2015, pp. 447-456.

W. Liu et al., "SSD: Single Shot MultiBox Detector." *European Conference on Computer Vision*. Springer, Cham, 2016, 17 pages.

* cited by examiner

SYSTEM AND METHOD FOR SEMANTIC SEGMENTATION OF IMAGES

CROSS-REFERENCE TO RELATED APPLICATION(S)

This application claims priority to and the benefit of U.S. Provisional Patent Application No. 62/547,740, filed in the United States Patent and Trademark Office on Aug. 18, 2017, the entire disclosure of which is incorporated by reference herein.

FIELD

The present disclosure generally relates to computer vision. In particular, the present disclosure relates to a system and method for semantic segmentation of images.

BACKGROUND

An image recognition system provides a computer application that detects and identifies an object or multiple objects from a digital image or a video frame. Deep learning-based systems and methods have been achieving increasingly accurate performance on visual comprehension. However, it may be difficult to detect an object in an image that is relatively small, cluttered, or occluded by other objects. Other typical systems may fail to detect such instances, or detect part of an object as a whole, or combine different portions of an object into the entire object. For example, a system may erroneously detect a first user's face and a second user's shoulder that is occluded as the same user.

SUMMARY

Aspects of embodiments of the present disclosure relate to systems and methods for semantic segmentation of input images.

According to one embodiment of the present disclosure, a method for detecting instances of objects in an input image includes: extracting a plurality of core instance features from the input image; calculating a plurality of feature maps at multiscale resolutions from the core instance features; calculating a plurality of detection boxes from the core instance features, each of the detection boxes corresponding to an object detected in the image; calculating a plurality of segmentation masks for each detection box of the detection boxes at the multiscale resolutions of the feature maps; merging the plurality of segmentation masks at the multiscale resolutions to generate an instance mask for each object detected in the input image, the instance mask being associated with a confidence score; refining the confidence scores of the merged segmentation masks by auxiliary networks calculating pixel level metrics; and outputting the instance masks as the detected instances of the objects in the input image.

The plurality of core instance features may be extracted by supplying the input image to a fully convolutional instance semantic segmentation network.

The feature maps at multiscale resolutions may be calculated by supplying the core instance features to a feature pyramid network.

The feature pyramid network may generate a feature map of the plurality of feature maps by: upsampling the core instance features from the fully convolutional semantic segmentation network; applying a convolutional kernel to a previous feature map to generate a convolved previous feature map; and combining the upsampled core instance features and the convolved previous feature map to generate the feature map.

The feature pyramid network may upsample the core instance features using a nearest neighbor technique.

The feature pyramid network may upsample the core instance features using a deconvolutional layer and an interpolation convolutional kernel.

The merging the plurality of segmentation masks at the multiscale resolutions to generate the instance mask may include calculating an intersection over self metric and removing instances where the intersection over self metric exceeds a threshold value.

The detection boxes may be calculated by supplying the core instance features to a region proposal network.

The method may further include: calculating a belonging bounding box for each pixel of the input image, each of the belonging bounding boxes specifying a bounding box position of the instance that the pixel belongs to; calculating a plurality of density metrics for each pixel in the input image; and filtering the instance masks in accordance with the density metrics to minimize a differential mask discrepancy calculated from the instance masks and the density metrics.

The calculating the belonging bounding box for each pixel of the input image may include calculating a four feature vector representing the belonging bounding box of the pixel, the four feature vector including: a topmost pixel; a bottommost pixel; a leftmost pixel; and a rightmost pixel.

The refining the confidence scores of the instance masks may include: computing an average bounding box from the belonging bounding boxes for the object detected in the image; calculating an intersection over union metric between the instance mask and the average bounding box; and scaling the confidence score of the instance mask based on the intersection over union metric.

The filtering the instance masks in accordance with the density metrics may include: calculating a pixel density discrepancy for every pixel in the image; calculating a differential mask discrepancy for each instance mask; and minimizing the differential mask discrepancy of a collection of surviving masks.

The differential mask discrepancy of the collection of surviving masks may be minimized using a greedy search by iteratively toggling a survival status of the instance mask with larger differential mask discrepancy to update the collection of surviving masks until the differential mask discrepancy is minimized.

According to one embodiment of the present disclosure, a system for detecting instances of objects in an input image includes: a core instance feature extraction network configured to generate a plurality of core instance features from the input image; a multiscale resolution feature map calculator configured to calculate a plurality of feature maps at multiscale resolutions from the core instance features; a detection box calculator configured to calculate a plurality of detection boxes from the core instance features, each of the detection boxes corresponding to an object detected in the image; a segmentation mask prediction network configured to calculate a plurality of segmentation masks for each detection box of the detection boxes at the multiscale resolutions of the feature maps; a pyramid segmentation network configured to merge the plurality of segmentation masks at the multiscale resolutions to generate an instance mask for each object detected in the input image, the instance mask being associated with a confidence score; and an output module configured to output the instance masks as the detected instances of the objects in the input image.

The core instance feature extraction network may include a fully convolutional instance semantic segmentation network.

The multiscale resolution feature map calculator may include a feature pyramid network.

The feature pyramid network may be configured to generate a feature map of the plurality of feature maps by: upsampling the core instance features from the fully convolutional semantic segmentation network; applying a convolutional kernel to a previous feature map to generate a convolved previous feature map; and combining the upsampled core instance features and the convolved previous feature map to generate the feature map.

The feature pyramid network may be configured to upsample the core instance features using a nearest neighbor technique.

The feature pyramid network may be configured to upsample the core instance features using a deconvolutional layer and an interpolation convolutional kernel.

The pyramid segmentation network may be configured to merge the plurality of segmentation masks at the multiscale resolutions to generate the instance mask by calculating an intersection over self metric and removing instances where the intersection over self metric exceeds a threshold value.

The detection box calculator may include a region proposal network (RPN).

The system may further include: a belonging bounding box prediction network configured to calculate a belonging bounding box for each pixel of the input image, each of the belonging bounding boxes specifying a bounding box position of the instance that the pixel belongs to; a density prediction network configured to calculate a plurality of density metrics; and a density based filtering module configured to filter the instance masks in accordance with the density metrics to minimize a differential mask discrepancy calculated from the instance masks and the density metrics.

The belonging bounding box prediction network may be configured to calculate the belonging bounding box for each pixel of the input image by calculating a four feature vector representing the belonging bounding box of the pixel, the four feature vector comprising: a topmost pixel; a bottommost pixel; a leftmost pixel; and a rightmost pixel.

The RPN based score refinement module may be configured to refine the confidence scores of the instance masks by: computing an average bounding box from the belonging bounding boxes for the object detected in the image; calculating an intersection over union metric between the instance mask and the average bounding box; and scaling the confidence score of the instance mask based on the intersection over union metric.

The density based filtering module may be configured to filter the instance masks in accordance with the density metrics by: calculating a pixel density discrepancy for every pixel in the image; calculating a differential mask discrepancy for each instance mask; and minimizing the differential mask discrepancy of a collection of surviving masks.

The differential mask discrepancy of the collection of surviving masks may be minimized using a greedy search by iteratively toggling a survival status of the instance mask with larger differential mask discrepancy to update the collection of surviving masks until the differential mask discrepancy is minimized.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
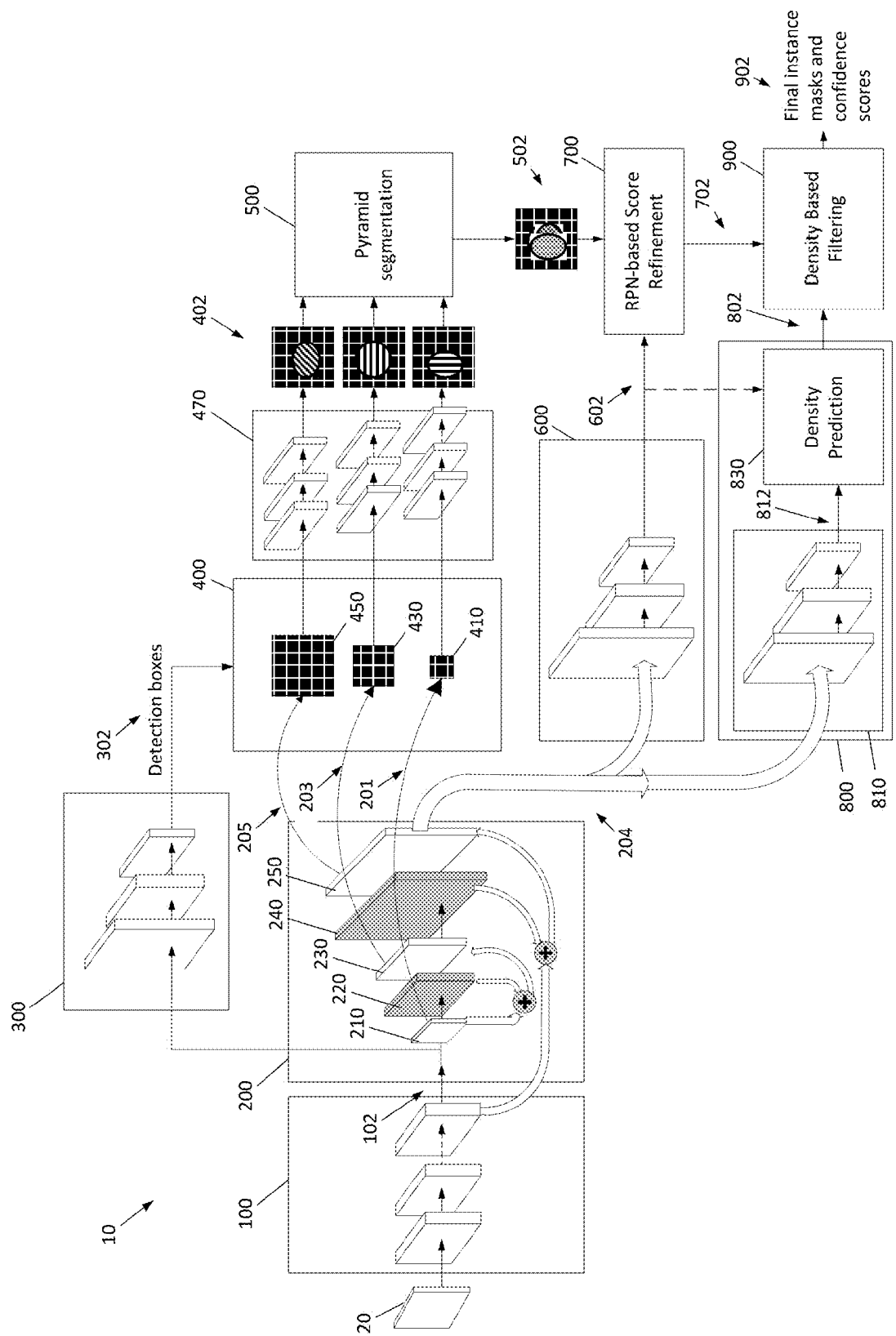
FIG. 1A illustrates an exemplary block diagram of the present system for instance semantic segmentation with multiple neural networks, according to one embodiment.

According to one embodiment, the present disclosure describes a system and method for fast and accurate instance semantic segmentation. The present system and method provides instance segmentation based on pixel-wise labeling of classes for each instance of an object class in the image, and produces each object detection in the form of a mask of the specific pixels in the image that belong to each instance of the object, a classification of the object category, and a confidence score of the detection.

For example, semantic segmentation of an image of a street scene may label all of the pixels associated with each car in the scene with the label of "car," all of the pixels associated with a person on a bicycle with the label "bicycle," and may label all of the pixels associated with people walking in the scene with the label of "pedestrian." Furthermore, a semantic segmentation system may generate, for each separate instance of an object in the image (e.g., each instance of a car in the scene), a separate instance mask identifying the pixels of the image that correspond to the separate instance of the object. For example, if the semantic segmentation system detects three cars and two pedestrians in the image, five separate instance masks are output: one for each of the cars and one for each of the pedestrians.

The present disclosure describes a system and method that performs instance segmentation with higher precision than comparative art by inferring additional "completeness" information about each pixel location that reasons with the completeness of an object and by using this information to guide the detection of the objects. Embodiments of the present disclosure further utilize a structure or architecture that can extract hierarchical features of the image at different scales efficiently, and aggregate these hierarchical features in a unifying fashion. Embodiments of the present disclosure utilize and aggregate information at different scales, which improves performance on smaller objects and in crowded scenes. Embodiments of the present disclosure may be trained using labeled training data (e.g., using a supervised learning process). The training process may be end-to-end by multi-task learning, where the additional information provided by additional deep neural networks directs the instance masks to be of complete, stand-alone objects, which improves performance in case of clutter and occlusion.

According to one embodiment, the embodiments of the present disclosure make use of information about the "completeness" of objects, such as by favoring the detection of the entirety of an object (e.g., by increasing the confidence score of the detection of entire objects), while discouraging only part of an object (e.g., by decreasing the confidence score of the detection of parts of objects), or multiple objects, or the union of parts belonging to different objects, to be considered one entity. Embodiments of the present disclosure further improve performance on small objects (e.g., objects that make up a small portion of the entire input image) by efficiently extracting information at different scales, and aggregating such information. Some embodiments of the present disclosure include an instance segmentation module that detects objects in an image and produces a corresponding category, belonging pixels, and confidence score. Embodiments of the present disclosure further include neural network layers that predict the information pertaining to object completeness, and techniques to leverage them for improving instance segmentation performance. Embodiments of the present disclosure can also reduce the likelihood of producing spurious detections.

An instance segmentation system according to one embodiment uses pixel-wise belonging bounding box position information to gauge the agreement of each instance segmentation with its associated pixels, in order to filter out erroneous detections. Embodiments of the present disclosure further use instance density prediction to gauge the detection completeness and make adjustments to improve detections in crowded scenes and of small objects. Embodiments of the present disclosure further provide efficient fusion of instance semantic segmentation masks from features at different scales.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

Figure 1B:
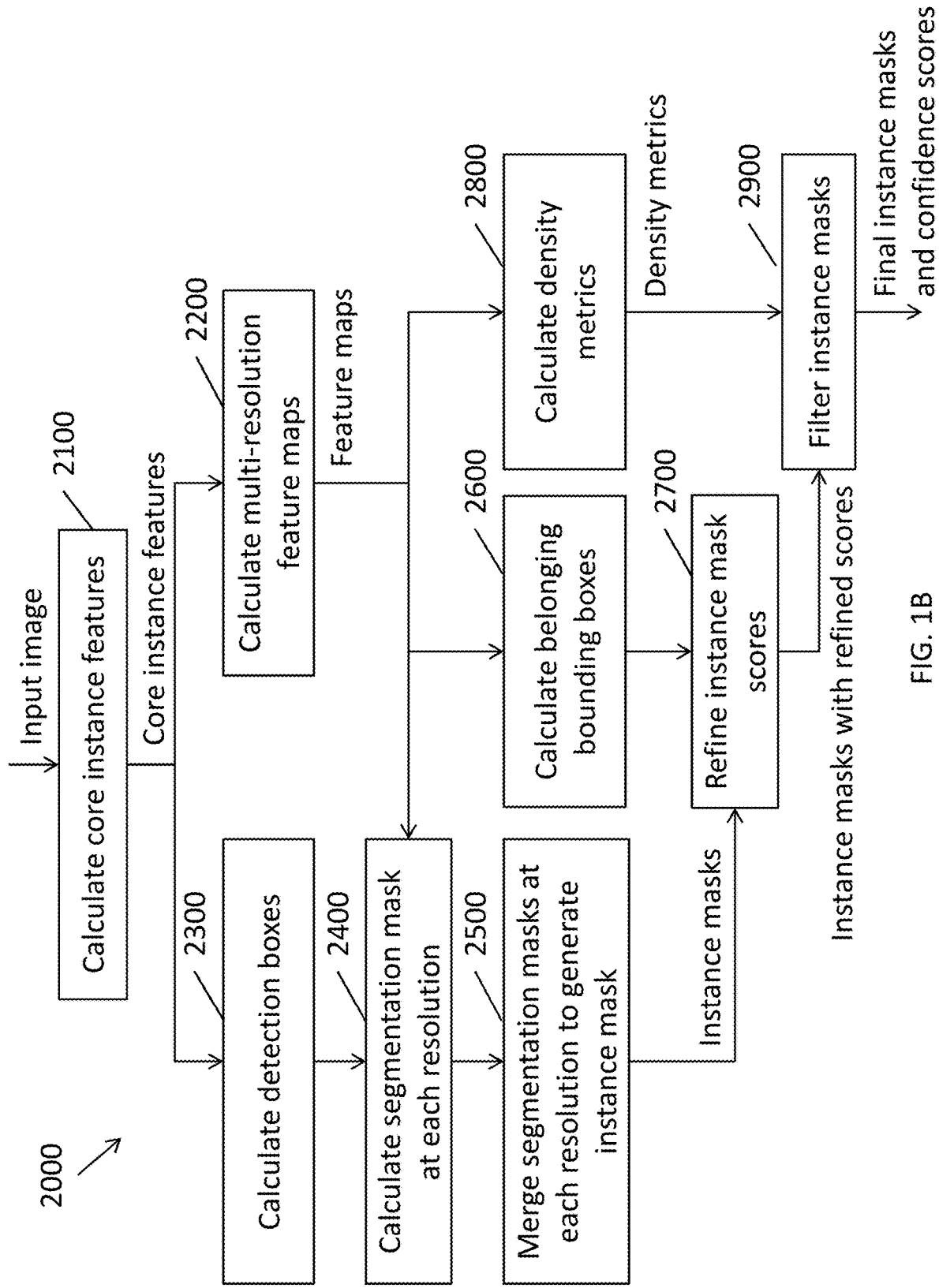
FIG. 1B is a flowchart of a method for semantic segmentation according to one embodiment of the present disclosure.

FIG. 1A illustrates an exemplary block diagram of the present system for instance semantic segmentation with multiple neural networks, according to one embodiment. FIG. 1B is a flowchart of a method for semantic segmentation according to one embodiment of the present disclosure.

As shown in FIGS. 1A and 1B, according to one embodiment, the system 10 for instance semantic segmentation includes a fully convolutional instance semantic segmentation (FCIS) core network 100, which, at 2100, processes the initial image to extract core neural network features 102 from an input image 20 (e.g., a bitmap image of a scene containing one or more objects, such as a photograph of a street). According to one embodiment of the present disclosure, the core neural network is a fully convolutional neural network that extracts different levels of representations of the input image. Fully convolutional neural networks are characterized by being fast, and can be applied on any input image. This is in contrast to networks that have fully connected layers, such as mask recurrent convolutional neural network (Mask-RCNN), which tend to be slower, have more parameters, and need to be adjusted for the input image sizes.

The core neural network features 102 are supplied to both a feature pyramid network (FPN) 200 and the region proposal network (RPN) 300.

The FPN 200 generates, at 2200, higher resolution feature maps 210, 230, and 250 of the input image and may apply upsampling to generate feature maps at multiple resolutions or scales. Generally, feature maps are downsampled in the core fully convolutional kernels (e.g., FCIS 100) by max or average pooling in order to improve the quality of the trained representations and to manage or constrain growth in the computational complexity of the deep neural networks (e.g., in neural networks containing many hidden layers). According to some aspects of embodiment of the present disclosure, the FPN 200 includes a final representation which is of higher resolution than the output of the FCIS 100 and which contains information from high-level representations as well. Accordingly, in one embodiment, the FPN upsamples a first feature map 210 using a nearest neighbor approach to generate a second feature map 220 of higher resolution, applies a convolution kernel transformation to the first feature map 210 of the same upsampled resolutions, then combines both representations into a third feature map 230 at the resolution of the upsampled feature map. The third feature map 230 can then be further upsampled to generate a fourth feature map 240 and combined with another kernel of similar resolution after a convolutional representation to generate a fifth feature map 250. This may be repeated until the desired resolution of the final feature map is achieved, with the limit being the resolution of the input image. This network is referred to being a feature "pyramid" because the size of the feature map increases at each level (e.g., feature maps of levels 210, 230, and 250). It is appreciated that there may be any number or level of feature maps without deviating from the scope of the present disclosure.

In some embodiments, the FPN performs the upsampling by a deconvolutional layer instead of nearest neighbor upsampling. In one embodiment, through a training process, the deconvolutional layer learns an interpolation convolutional kernel to be convolved with feature map after upsampling by simply inserting zeros.

Embodiments of the present disclosure consider not only the final representation with the highest resolution as the output of the FPN, but also all levels of the pyramid (e.g., the feature maps 210, 230, and 250) as providers of different multiscale representations, where each representation is a combination of the representations at current scale and smaller scales. As depicted by the separate arrows 201, 203, and 205, the multi-resolution feature maps 210, 230, and 250 (feature maps at multiscale resolutions) are supplied to the segmentation mask prediction network 400, which is described in more detail below.

At 2300, the RPN 300 generates a plurality of detection boxes or bounding boxes (RPN BBoxes) 302 corresponding to the locations of individual features. Each of the detection boxes is defined by a plurality of box coordinates that identify a region of interest that corresponds to one of the objects in the image (e.g., the RPN generates a detection box for each object it detects in the image). The quality of instance semantic segmentation is governed by having a fairly accurate RPN that does not miss any detection. However, having a high recall (do not miss detections) usually results in multiple false detections as well.

The multi-resolution feature maps 210, 230, and 250 and the bounding boxes 302 are supplied to a segmentation mask prediction network 400 or segmentation mask head, which, at 2400, generates predicts a segmentation mask for each object class at each of the resolutions of the feature maps 210, 230, and 250 from the FPN 200. The segmentation mask head is a fully convolutional deep neural network that is trained to predict a segmentation mask for each box proposal 302 from the RPN 300, and for each object class. The segmentation mask prediction network 400 (or segmentation mask head) is configured to predict a segmentation mask from a cropped feature map corresponding to an RPN bounding box (e.g., a portion of a feature map, as cropped by an RPN bounding box), either by a one shot prediction or for each grid cell after pooling the feature map crop corresponding to the RPN into a fixed-size grid of cells. The segmentation mask head 400 is further configured to provide a pixel-level classification score for each class (e.g., each class of object to be detected by the instance semantic segmentation system 10, where the classes may include, for example, humans, dogs, cats, cars, debris, furniture, and the like), and can also provide a pixel-level score of falling inside or outside a mask. The pixel level scores are aggregated over each mask to produce a confidence score for the mask. According to one embodiment of the present disclosure, the instance semantic segmentation system 10 provides segmentation mask prediction by aggregating all intermediate feature maps of different scales (instead of using a single feature to provide to the segmentation mask predictor, or choosing only one single pyramid scale for each region of interest). In the embodiment shown in FIG. 1A, features at three scales are shown as 410, 430, and 450, which represent feature maps at the different feature scales that are from different feature maps 210, 230, and 250 computed by the FPN 200.

Generally, the later stage feature maps (e.g., the third and fifth feature maps 230 and 250) have a larger receptive field and also have higher resolutions than earlier stage feature maps (e.g., first feature map 210). As such the later stage feature maps may be better suited to detect certain kinds of objects, such as very small objects or objects which need a larger global view to understand their semantics. However, earlier stage feature maps (e.g., from level 210) can be more robust to noise because they have lower resolutions than higher level feature maps, and may be better suited for recognizing large objects. Some embodiments of the present disclosure include a mask prediction head 470 on the FPN, which takes the multiscale feature maps from each of the layers and the RPN bounding boxes to predict a segmentation mask for each class (together with a classification score or confidence score) from each FPN scale (e.g., from resolution scales/levels of the FPN 210, 230, and 250) and within each of the RPN bounding boxes 302.

The segmentation masks 402 are then supplied to a pyramid segmentation network 500 to generate, at 2500, a segmentation mask 502 for a particular object, as generated from the separate masks generated at different resolutions (e.g., at the different resolutions of the multi-resolution feature maps 410, 430, and 450) by the segmentation mask prediction network 400. According to one embodiment, the present system learns a combination of the segmentation masks predicted at multiple scales of the FPN. For each class, each mask and RPN box is defined by a pixel-wise score.

Various embodiments of the present disclosure may use different methods to combine FPN segmentation masks that are estimated at different scales. One method is to learn a combination of the segmentation masks at multiple scales is to deploy a combining head composed of a combining layer to learn the weighted combination of the segmentation masks. Average combining takes all the FPN segmentation masks for a specific class within each bounding box, and assigns the score for each pixel as the average score over the individual FPN masks which were combined. Maximum combining assigns the maximum score for each pixel in the mask instead. Non-max suppression combining choses the FPN segmentation mask with the largest aggregate score over its pixels as the survival mask, and eliminates all other masks. In all cases, the output mask from the pyramid segmentation network should in general be more accurate than a mask predicted from the single output of the core fully convolutional network directly. It is also much faster than the running the instance semantic segmentation network multiple times on different scales of the input image.

According to one embodiment, the present system provides a pyramid segmentation network to prevent false positives based on detections that are totally overlapped with other detections of same class. The present system includes a metric referred to as an Intersection over Self (IoS) that eliminates detections almost totally contained in other detections: IoS=(Intersection area with other detection)/Self Area; If the IoS=1 means the detection is totally contained in another and can be safely discarded. Hence the present system may discard detections where IoS exceeds some threshold, where the threshold is a value less than, but close to, 1 (thereby indicating a large degree of containment in the other region).

The higher resolution feature maps, such as the third feature map 250, produced by the FPN 200 are also provided to a belonging-bounding box (BBBox) prediction network 600 and a density prediction network 800. The BBBox prediction network 600 and the density prediction network 800 may be referred to herein as "auxiliary networks."

At 2600, the BBBox prediction network 600 computes, for each pixel in the input image 20, a belonging bounding box (e.g., pixel coordinates) containing the object that the pixel is a part of. In more detail, according to one embodiment, the BBBox prediction network is trained to produce, for each pixel, the coordinates of the bounding box of the (most dominant) instance mask it belongs to. To simplify the training, rather than regressing to the coordinates of the bounding box directly, the network is trained by regressing on ground truth maps to output four feature maps, each having the same size as the input image 20, where each pixel of the feature maps denotes its distance from the top, bottom, left, and right edges of its belonging bounding boxes, respectively. As such, instead of predicting bounding boxes, the BBBox prediction network 600 according to one embodiment of the present disclosure predicts a polygon defined by its four corners, the topmost pixel in the instance, the bottommost pixel, the leftmost pixel and rightmost pixel. The polygon may provide a more accurate representation of an instance of an object that is not necessary rectangular. The belonging bounding box may be referred to herein as a rectangular or polygonal prediction herein.

According to one embodiment, the BBBox prediction network 600 predicts the belonging instance positions for each pixel directly. At each pixel in the image, a vector defining the bounding box position of the instance it belongs to is predicted. In some embodiments, the vector includes the coordinates of the top left and bottom right corners, which gives the bounding boxes of these embodiments a rectangular shape. As such, the BBBox prediction network 600 computes a bounding box 602 for each pixel, represented as a 4-channel map with the resolution of the original image.

In one embodiment, the BBBox prediction network 600 is implemented by adding a computational head layer on top of a base layer within the original neural network—either on the final convolutional layer, or on a layer of the feature pyramid 200. New fully convolutional layers may be constructed as the head. The final output is a 4-channel map with the same resolution of the base layer that is upsampled back to the resolution of the image.

During a training process for training the BBBox prediction network, the ground truth position is computed as follows. Let $o_k$ denote the k-th ground truth object, let bbox($o_k$) represent the bounding box coordinates of $o_k$, and let $t_{ij}$ signify the absolute position target for pixel i∈$o_k$, channel j. For the sake of discussion, suppose there are four channels (top, left, bottom, right coordinates) with the four channels defining the bounding box coordinates of instance $o_k$, with j∈{1,2,3,4}.

$$(t_{i1}, \ldots, t_{i4})^T = bbox(o_k) = \begin{pmatrix} top(o_k) \\ left(o_k) \\ bottom(o_k) \\ right(o_k) \end{pmatrix}, \forall i \in o_k.$$

For background pixels (e.g., pixels not corresponding to an object such as a vehicle or human), no loss is applied to the prediction, and instead the BBBox prediction module 600 fills in zeros for background pixels.

Figure 2A:
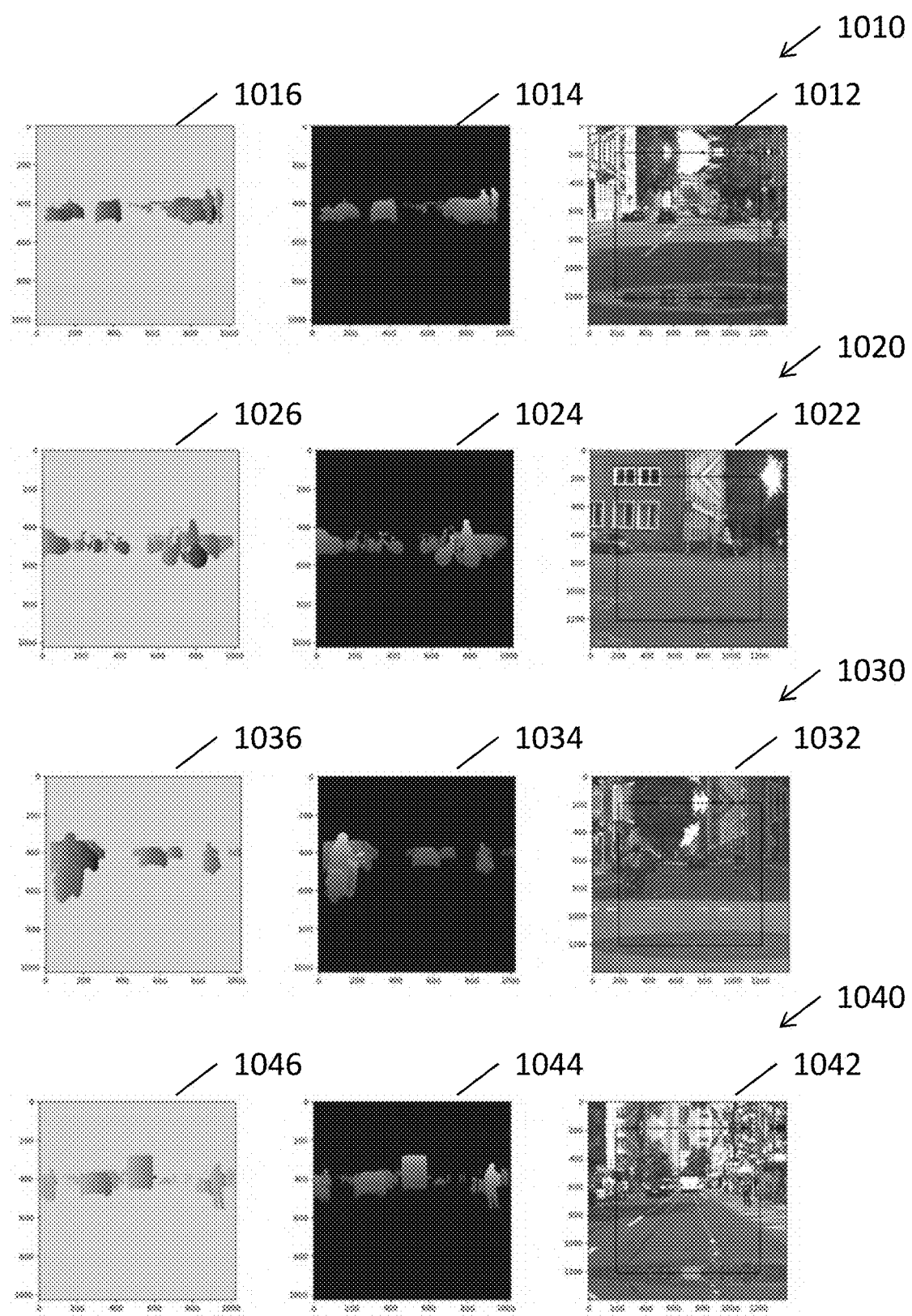
FIG. 2A illustrates an exemplary diagram of images' positional regression target maps, according to one embodiment of the present disclosure.
Figure 2B:
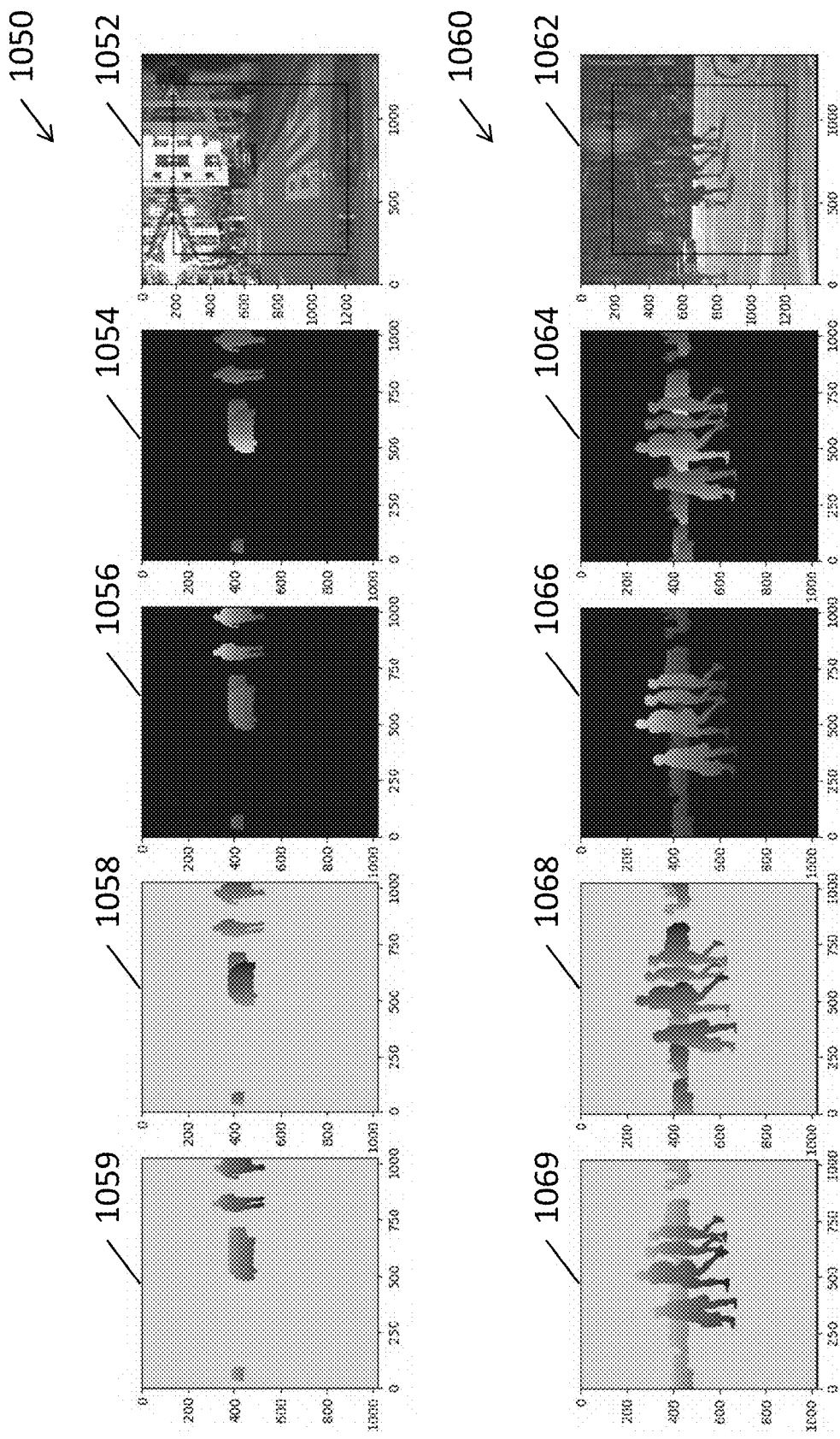
FIG. 2B illustrates two examples of the four features calculated from two input images according to one embodiment of the present disclosure.

However, a convolutional neural network (CNN) is translation invariant, so a neuron does not know the offset of the receptive field it is looking at, but that information is needed to predict the absolute coordinates. This is solved by adding the xy-coordinate map as part of the features. In one embodiment, in the training progress regresses to a scaled relative position target $\bar{t}_{ij}$:

$$\begin{pmatrix} \bar{t}_{i1} \\ \bar{t}_{i2} \\ \bar{t}_{i3} \\ \bar{t}_{i4} \end{pmatrix}^T = \lambda_{pos} \begin{pmatrix} t_{i1} - y(i) \\ t_{i2} - x(i) \\ t_{i3} - y(i) \\ t_{i4} - x(i) \end{pmatrix}, \forall i \in o_k$$

which is the distance of each pixel to the top, left, bottom, right edge of its belonging bounding box. Here, the scaling factor $\lambda_{pos}$ may be set at 10/w, where w is the width of the image to make the target small enough for the network to regress to. Empirically, the network tends to produce small values due to the weight initialization scales, making it hard to regress to values such as 800. Because the pixel coordinates y(i), x(i), and $\lambda_{pos}$ are known for all i, $t_{ij}$ can be recovered from $\bar{t}_{ij}$. FIG. 2A illustrates an exemplary diagram of images' positional regression target maps, according to one embodiment of the present disclosure. In particular, FIG. 2A shows four sets of images 1010, 1020, 1030, and 1040. Each of the 4 sets 1010, 1020, 1030, and 1040 includes an input image, 1012, 1022, 1032, and 1042, respectively. Each of the 4 sets 1010, 1020, 1030, and 1040 also includes an image depicting a distance to the bottom of the bounding box 1014, 1024, 1034, and 1044 (where yellow indicates larger distances and blue indicates smaller distances). In addition, each of the 4 sets includes an image 1016, 1026, 1036, and 1046 showing a distance to the left side of the bounding box (where yellow indicates larger distances and blue indicates smaller distances). FIG. 2B illustrates two examples 1050 and 1060 of the four features calculated from two respective input images 1052 and 1062 according to one embodiment of the present disclosure. The first four images in each row depict the four features (distances to topmost, leftmost, bottommost, and rightmost sides of the bounding box) computed for an input image (the image shown on the far right). For the first row 1050, the images 1059, 1058, 1056, and 1054 respectively depict the distances to topmost, leftmost, bottommost, and rightmost sides of the bounding box, where yellow indicates smaller distances and blue indicates larger distances. Similarly, for the second row 1060, the images 1069, 1068, 1066, and 1064 respectively depict the distances to topmost, leftmost, bottommost, and rightmost sides.

According to one embodiment, the present system uses $L_2$ regression on the map to train the network because not all pixels are equally important in the metric and quality of result, and using equal weights for all pixels would focus on the larger objects much more than smaller cluttered objects. In some embodiments, infrequent classes are weighted more (inversely proportional to the number of instances in each class). In some embodiments, pixels from smaller objects are weighted more (inversely proportional to the number of pixels in the object). In some embodiments, regression with larger positional values are weighted less, such that a position wrong by 20 pixels in a 100-pixel object is penalized by the same amount as a position wrong by 200 pixels in a 1000-pixel object (inversely proportional to object length or height).

When testing performance, the prediction is determined and transformed back to $t_{ij}$. Then, for each detection $o_k$ from the previous operation, the mask computed by the BBBox prediction network 600 is iterated over its pixels i∈$o_k$ to compute the level of agreement between the RPN bbox($o_k$) and the $t_{ij}$, i∈$o_k$. In various embodiments, this can be done by, for example, computing the average Intersection over the Union (IoU) of all of the bounding boxes, where for |$o_k$| representing the number of pixels in the detection instance $o_k$ $$\frac{1}{|o_k|} \sum_i IoU(bbox(o_k), t_{ij}),$$

or computing the IoU of the average bounding box:

$$IoU\left(bbox(o_k), \frac{1}{|o_k|} \sum_i t_{ij}\right).$$

According to one embodiment, this agreement score is compared against a threshold and, if it is lower than the threshold, the detection confidence of $o_k$ is reduced.

The bounding boxes (BBBoxes) 602 computed by the BBBox prediction network are supplied to an region proposal network (RPN) based score refinement module 700, which, at 2700, adjusts the confidence in the segmentation mask 502 generated by the pyramid segmentation network 500 based on the level of agreement between the segmentation mask 502 and the bounding boxes 602 to generate an adjusted segmentation mask 702.

Figure 3:
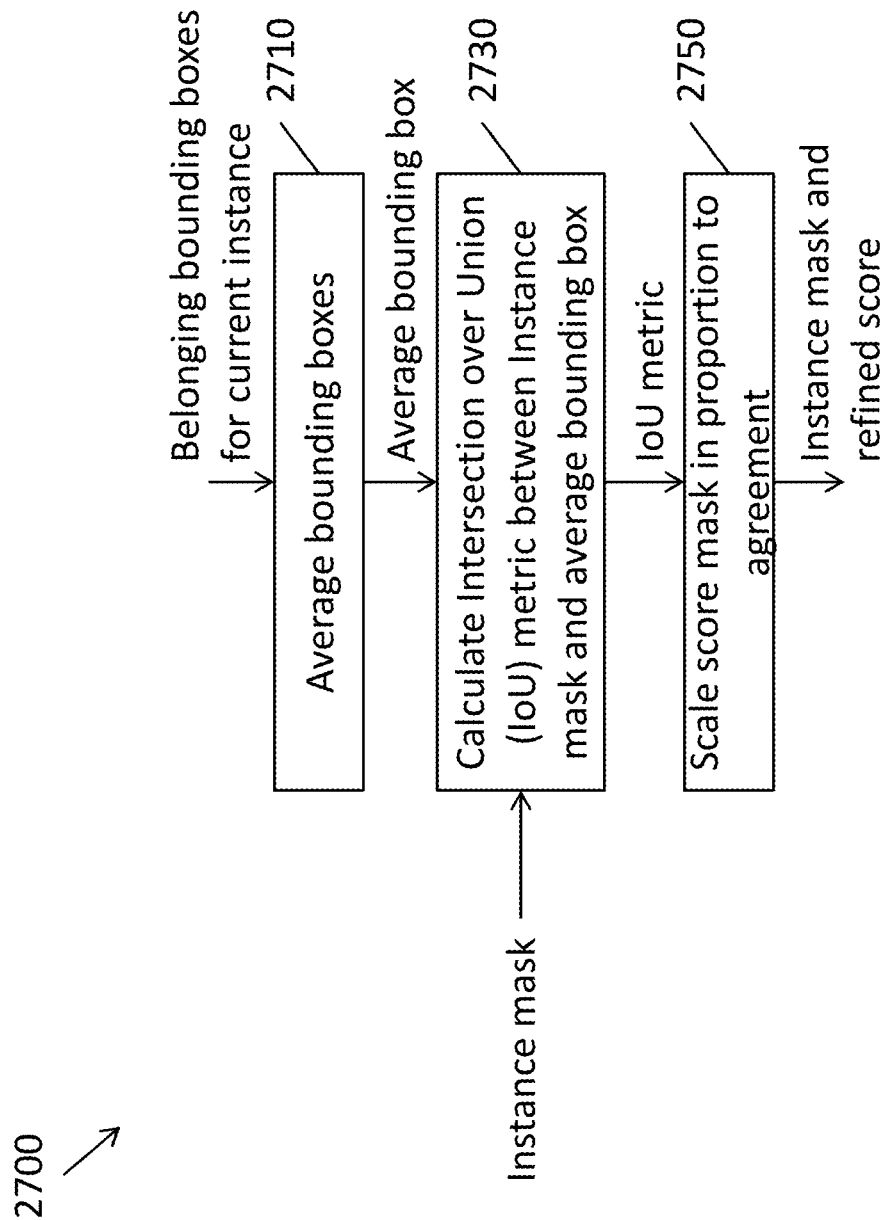
FIG. 3 is a flowchart of a method for refining object segmentation mask scores according to one embodiment of the present disclosure.

FIG. 3 is a flowchart of a method for refining object segmentation mask scores according to one embodiment of the present disclosure. In more detail, the score of each instance segmentation mask 502 generated by the pyramid segmentation network 500 is refined based on the degree of agreement between the RPN bounding box 302 associated with that instance segmentation mask and the predicted belonging-bounding box 602 from the BBBox network. As noted above, each pixel of the original image 20 has a predicted BBBox associated with it, as calculated by the BBBox prediction network 600. At 2710, the RPN-based score refinement module 700 averages the predicted BBBoxes of all pixels that are classified to be inside the segmentation mask 502 to produce an average predicted BBBox. At 2730, the RPN-based score refinement module 700 computes an intersection over union (IoU) metric (area of intersection between a plurality of predicted BBBoxes divided by the area of their union) between the average predicted BBBox and the RPN BBox associated with this mask. At 2750, the RPN-based score refinement module 700 scales the scores of the masks in proportion to their corresponding IoU metric to generate a refined score for the instance mask. A large IoU metric indicates agreement between the RPN and the BBBox network results associated with this mask, and the confidence in this mask is increased.

At 2800, the density prediction network (DPN) 800 computes a density metric 802 from the high resolution feature maps 204 (e.g., the third feature map 250) that indicates, for each pixel, a measure of the size of the instance that the pixel is a part of and a measure of the crowdedness of its neighborhood of pixels, in terms of the number of overlapping instances in the neighborhood (e.g., the number of objects that are invisible or occluded at that pixel). In more detail, a hierarchical density prediction network 810 of the density prediction network 800 is trained to compute a metric for each pixel using hierarchical features 812, where the metric indicates a measure of the size of the instance it belongs to and a measure of the crowdedness of its neighborhood in terms of number of overlapping instances. Pixels belonging to smaller object instances and/or in crowded areas will have larger density because there may be many overlapping bounding boxes that contain the given pixel, as calculated by the density prediction module 830 (which can also be considered to be the final layer of the hierarchical density prediction network 810) based on the hierarchical features 812. The density prediction network 800 is trained to predict for each pixel p the aggregate sum of the reciprocals of the sizes of the instances I it belongs to:

$$\sum_{I:p \in I} \frac{1}{\text{size}(I)},$$

where size(I) refers to the estimated size of the detected instance of an object in the input image 20 (e.g., in terms of number of pixels). Equivalently, the definition of pixel-wise density map d for pixel i may be shown as follows:

$$d_i = \sum_{k|p \in o_k} \frac{1}{\text{size}(o_k)},$$

where size($o_k$) is the number of pixels in the object $o_k$. In general, the density prediction network 800 can be trained by regression to the ground truth density maps. The area of the predicted belonging bounding box per pixel p can also be used to refine its estimate of size(I).

According to one embodiment, the present system further modifies confidence scores of detected object masks to better match the estimation of how many objects are there in a certain region. A typical FCIS (e.g. FCIS 100) performs worse with cluttered objects. However, the FCIS detects occluded patterns and small-scale patterns. While it may be difficult for the network to determine which object is the occluder and which object is the occlude (the occluded object), the network can estimate roughly how many objects are there in any particular region. As such, in some embodiments, after the estimation, the present system reduces or eliminates any discrepancy between the predicted density map and the computed density from the detection by changing the confidence score of detections.

Generally, the confidence score can be adjusted by assigning each instance object a mass of 1, that is uniformly distributed across its pixels. When objects overlap, the density of the pixels in the overlapping region is the sum of all their densities. In this way, when there is higher density, it can be inferred that there are more instances in the region, whether by objects having smaller scales, by occlusion, or by objects overlapping with each other. Furthermore, the sum of the density map over the image is the total number of objects within.

Figure 4:
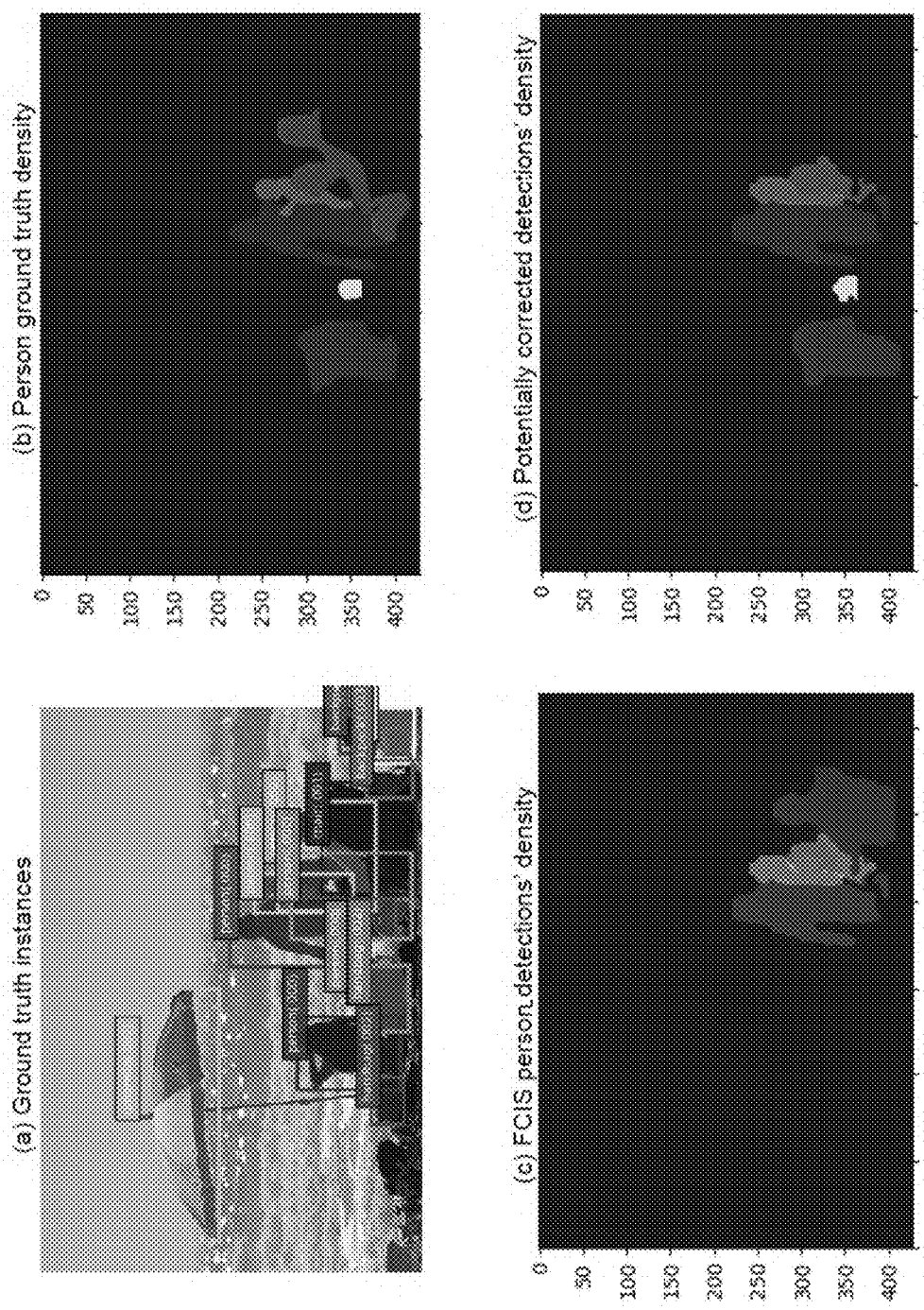
FIG. 4 illustrates exemplary diagrams for density prediction, according to one embodiment of the present disclosure.

FIG. 4 illustrates exemplary diagrams for density prediction, according to one embodiment of the present disclosure. FIG. 4(*a*) depicts ground truth instances and their corresponding bounding boxes. The present system determines and predicts the pixel-wise density for the image, where each instance gets a mass of 1. This can be used to guide the detection confidence to conform to object completeness.

The density may be computed for an entire image, or it can be computed for each category separately by exclusively summing up for objects that belongs to one category. Predicting per-class density requires more computational power, but provides more precise results than computing the density for all classes at once. The densities can be computed from ground truth, leading to a ground truth density (see FIG. 4(*b*)), or be computed from selected detections, e.g. by rendering masks of the detections with confidence above some threshold (see FIGS. 4(*c*) and 4(*d*)).

According to one embodiment, the present system predicts the pixel-wise density directly from the network by adding another head parallel to the FCIS score maps. In some embodiments, the prediction can be a regression, or, in other embodiments, quantized values classification. In the case of a regression, because the density varies greatly, the density may be regressed to the log value of the densities log($d_i$). When there is no object, the density will be zero, and cannot be regressed to log(0)—the present system uses a density value smaller than 1 object per image as a proxy regression target for these pixels (for example, log(0.25/(640×1280))≈−15.00 may be used).

At 2900, after both the FCIS detections 702 and density prediction 802 are obtained, the density based filtering module 900 according to one embodiment thresholds the detection confidence with a detection confidence threshold value to produce the final segmentation map and visualize its results. In more detail, the density based filtering module 900 may filter the adjusted mask instances 702 based on the calculated density metrics 802 in order to reduce or minimize the discrepancy between those calculations.

Generally, methods for detecting instances of objects in images typically over-detect, and therefore, according to some embodiments of the present disclosure, only those detected instances that satisfy (e.g., exceed) a threshold C (e.g., in terms of confidence score, such as a threshold of 0.7) will be returned as the output final instance masks and their respective confidence scores 902 (e.g., for visualization by displaying the detected classes on a display device for a user to review or to be supplied to a control algorithm for controlling, for example, an autonomous vehicle), and metrics that evaluate performance would focus more on high-confidence detections.

According to one embodiment of the present disclosure, to account for the over-detection in the adjusted mask instances 702, some of the adjusted mask instances 702 can be removed (or "toggled off") in accordance with the density metrics 802. To this end, in some embodiments, the density based filtering module 900 computes the pixel-wise densities of the remaining detections, and subtracts the pixel-wise densities from the predicted densities to obtain the "discrepancy" for each pixel. The discrepancy map is the mismatch between density map of the output detections as filtered based on having confidence scores satisfying the threshold C and the density prediction at each pixel. The sum of absolute value of the discrepancy map may be minimized by toggling or modifying the confidence scores of those filtered output detections from their value above the threshold of 0.7 (on) to be a value below 0.7 (off), or vice versa:

$$\text{onoff}: \{o_k \in \text{detections}\} \mapsto \{1, 0\}$$

$$\text{onoff} = \text{argmin}_{onoff} \sum_i |d_{gt}(i) - d_{detections,onoff}(i)|.$$

Figure 5:
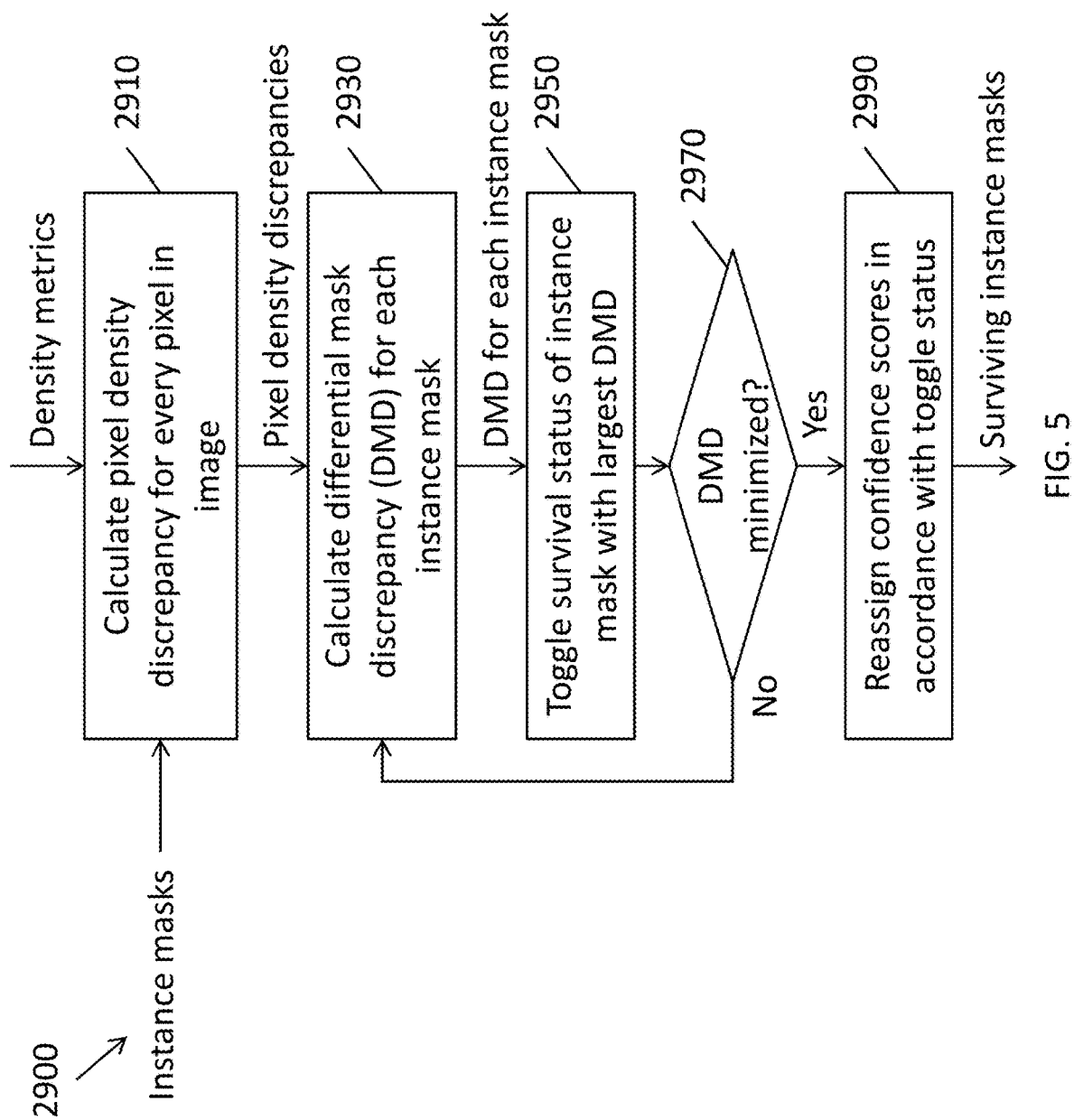
FIG. 5 is a flowchart of a method for density based filtering according to one embodiment of the present disclosure.

When applying the threshold at 2900, surviving masks from all classes collectively define a surviving segmentation map over the whole image (e.g., over all of the pixels of the input image 20) from which the pixel density, as defined above, is calculated. FIG. 5 is a flowchart of a method for density based filtering according to one embodiment of the present disclosure.

At 2910, the density based filtering module 900 calculates a pixel density discrepancy for each pixel of the image, where the density discrepancy of a single pixel is defined as the difference between the calculated pixel density and the pixel density predicted by the density prediction network 800. A mask density discrepancy (MDD) is defined as the sum of pixel density discrepancies over all pixels contained within the region of the image corresponding to that mask. A toggled mask density discrepancy (TMDD) is the mask density discrepancy MDD after its survival status has been toggled (to surviving if it was non-surviving and vice versa). The differential mask discrepancy (DMD) is defined as the difference between the mask density discrepancy and the toggled mask density discrepancy (DMD=MDD−TMDD). Density based filtering adjusts the scores of the predicted instance segmentation masks to minimize the discrepancy between the predicted mask density from the DPN and the actual calculated mask density from the surviving segmentation map.

Hence, at 2930, the density based filtering module 900 calculates the DMD of each instance mask 702. At 2950, the density based filtering module 900 toggles the survival status of the mask with the largest DMD. The DMDs are then recalculated for all instance masks overlapping with that toggled mask, and the mask with the largest DMD is found, and its survival status is toggled, and so on until the DMD is minimized.

In one embodiment, this minimization is performed by a greedy search—toggling on or off the detection that leads to the maximum decrease in the optimized function. As such, at 2970, the density based filtering module 900 determines whether the DMD has been minimized (e.g., when no toggle can further decrease MDD). If not, then the process continues at 2930 to recalculate the DMDs and toggle another mask at 2950. On the other hand, if the DMD is minimized, then at 2990, the density based filtering module 900 reassigns confidence scores to match the toggled survival status. After the greedy search converges, the confidence of the confidence scores that do not agree with the toggling may be changed using a simple bijective linear mapping between [0, 0.7] (for instance masks that are to be toggled off) and [0.7, 1] (for instances masks that are to be toggled on).

The resulting set of surviving mask instances that satisfy the threshold confidence score are then output as the final masks for each class, along with the confidence score for each of those masks.

As noted above, some embodiments of the present disclosure include a feature pyramid architecture with FCIS. Feature-pyramid-like structures have been used in other fields. One particular architecture, Feature Pyramid Network (FPN), has led to competitive results in object detection by only using the final largest scale, and is further used in mask recurrent convolutional neural network (Mask-RCNN).

Aspects of embodiments of the present disclosure are directed to producing or training a feature pyramid efficiently in one forward pass, where the features at multiple scales behave similarly on all pyramid layers, and all have the high-level information as a top layer in a recognition network, while also being used, with FCIS to operate on input images of a variety of different sizes (e.g., operating substantially independently of the size of the input image).

Figure 6A:
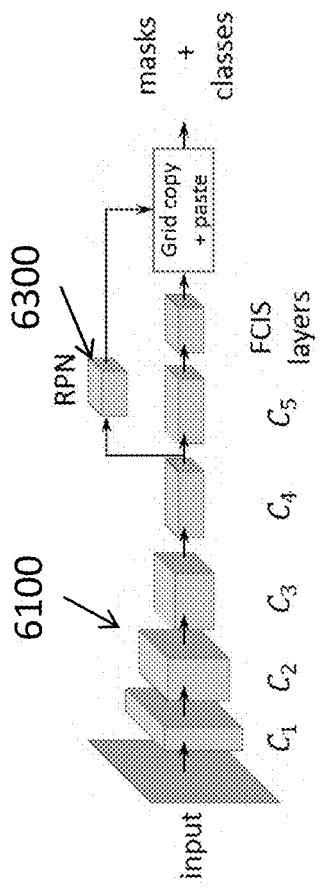
FIG. 6A illustrates an exemplary diagram of comparative FCIS architecture without FPN layers.
Figure 6B:
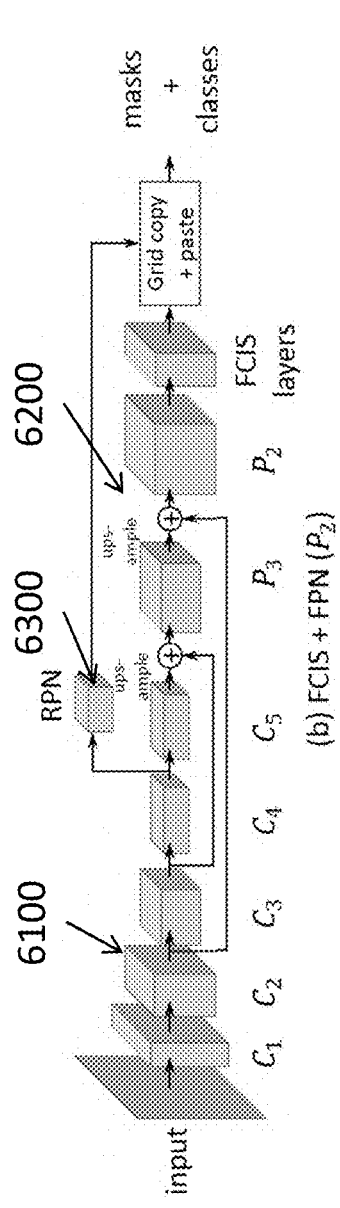
FIG. 6B illustrates an exemplary diagram of an architecture incorporating FPN in FCIS, according to one embodiment of the present disclosure.
Figure 6C:
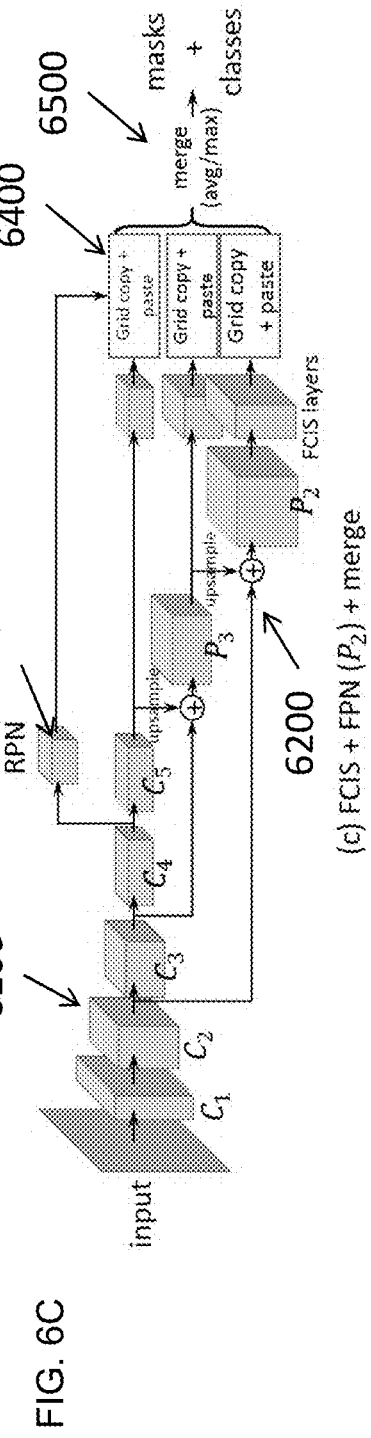
FIG. 6C illustrates an exemplary diagram for using FPN multi-scale aggregation, according to one embodiment of the present disclosure.

FIG. 6A illustrates an exemplary diagram of comparative FCIS architecture without FPN layers. FIG. 6B illustrates an exemplary diagram of an architecture incorporating FPN 6200 in FCIS, according to one embodiment of the present disclosure. FIG. 6C illustrates an exemplary diagram for using FPN multi-scale aggregation, according to one embodiment of the present disclosure.

A method for constructing an FCIS with an FPN 6200 according to one embodiment of the present disclosure starts with a common pre-trained neural network (e.g. ResNet-101), and separates the convolutional layers of the pre-trained neural network into groups by their spatial resolution—or equivalently, strides between neighboring feature map pixels back on the image scale. For example, the conv1 group has a stride of 2, while the conv5 group has a stride of 32. The top layer of each group is called $\{C_1, \ldots, C_5\}$ separately. Then, the top convolution output iteratively goes through upsampling and lateral connections to produce the pyramid outputs $\{P_5, \ldots, P_1\}$ respectively. Each coarser pyramid layer $P_{n+1}$ is first upsampled 2× (e.g., using nearest neighbor), then the corresponding convolutional layer output $C_n$ goes through one 1×1 convolution, and the result is added to the upsampled $P_{n+1}$ which provides $P_n$ output. In the end, the prediction (e.g. region proposal, region of interest (RoI) pooling) are performed on each of the pyramid outputs $\{P_5, \ldots, P_1\}$.

According to one embodiment, the present system adapts FPN 6200 into the present framework (see FIG. 6B). Each regional proposal box from the RPN 6300 is pooled into a grid of k×k cells. Two masks are predicted for each one of these $k^2$ cells and for each class. The first mask predicts the pixels that represent background. The second mask predicts the pixels that represent foreground. In total, this results in $2k^2$ position sensitive score maps, because each score map depends on the location of the cell in the k×k grid. As such, when using a FCIS-style framework, for each category, the final output has $2k^2$ channels dedicated to each grid location, inside and outside. These score maps are predicted by adding 1×1 convolutional layers on top of the $C_5$ layer, which, due to dilated convolutions, has a stride of 16 instead of 32. In some embodiments of the present disclosure, the FPN technique is further applied to construct the $P_3$ pyramid layer, or both $\{P_3, P_2\}$ pyramid layers (as shown in FIG. 6B), or all of the $\{P_3, P_2, P_1\}$ pyramid layers. These layers have even smaller strides (8, 4, and 2) than the feature map of the FCIS. In some embodiments, the convolutional layers may be placed on the finest pyramid layer instead, to obtain a higher resolution score map. All the hyperparameters (e.g. weight initialization, number of channels in the feature map, and the like) remain the same as FCIS.

While RPN can also use FPN features at different scales, in some embodiments, to simplify the computations, only the score map computing (which is analogous to the RoI pooling) is performed on only the finest layer of the pyramid, while the RPN's input remain unchanged.

In various embodiments, the feature pyramid layers can be used in different ways. One is to use only the finest layer as shown in FIG. 4(*b*), where only $P_2$ is used. Another is to selectively use specific layer based on the object size or detection size. In still another embodiment, the heads on all pyramid layers are applied (see, e.g., FIG. 4(*c*), where $P_2$ and $P_3$ are both used). The heads share the same weights, take each feature pyramid layer as input and produce different-sized score maps as output. The pooling layers in either Mask-RCNN or FCIS produce fixed-size score maps or feature maps (e.g. 21×21), and may be applied to all the differently-sized output maps to get one fixed size map for each region-of-interest, and each scale. The present system aggregates over the different scales by applying an average reduction or a maximum reduction to obtain one set of map for each region-of-interest, which would have the same dimensionality as if it were obtained from a single pyramid scale. Then the rest of the pipeline, e.g., softmax and loss layer or subsequent convolutional layers, is applied.

Figure 7:
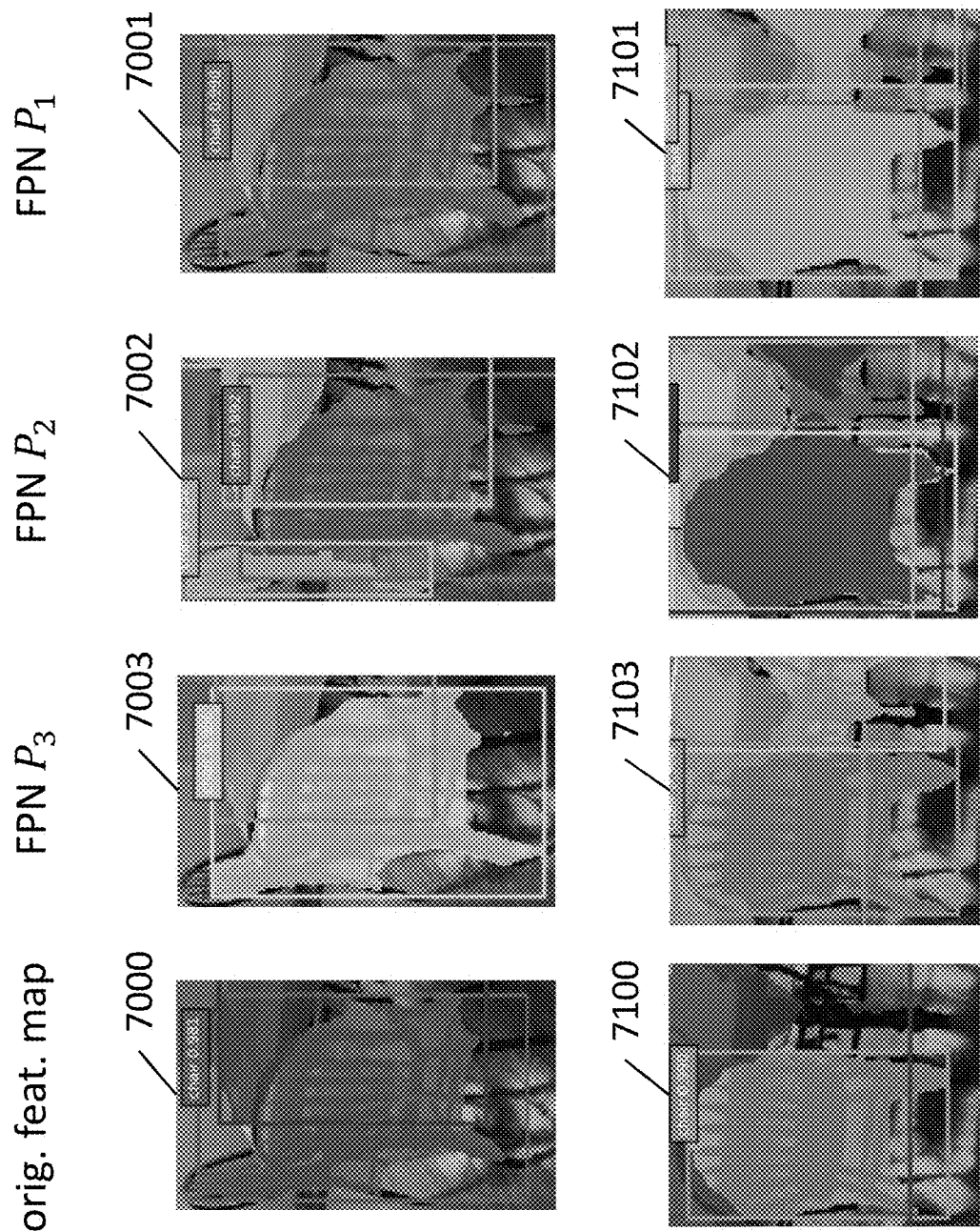
FIG. 7 depicts examples of results using different levels of FPN features according to various embodiments of the present disclosure.

FIG. 7 depicts examples of results using different levels of FPN features according to various embodiments of the present disclosure. In more detail, the each row shows the output detected bounding boxes for four different semantic segmentation systems: a baseline system (marked "orig. feat map"), and systems with where different pyramid layers are used (labeled "FPN $P_1$," "FPN $P_2$," and "FPN $P_3$"). As seen in FIG. 7, FPN $P_2$ provides a more accurate results than the baseline system (e.g., depicted in the "orig. feat. map") containing only an FCIS and more accurate results than produced by FPNs $P_3$ and $P_1$. For example, in the outputs 7000, 7003, and 7001 of the orig. feat. map, FPN $P_3$, and FPN $P_1$, respectively, the outline containing the chair in the foreground also extends to include the chair in the background behind and to the left of the chair in the foreground. On the other hand, the output of FPN $P_2$, 7002 shows separate detections for the foreground chair and the background chair (depicted in brown and teal, respectively). Images 7100, 7103, 7102, and 7101 respectively depict the outputs of the baseline system, FPN $P_3$, FPN $P_2$, and FPN $P_1$ for a different input image. As shown in 7100, the baseline system detects only one chair in the image, while FPN $P_3$, FPN $P_2$, and FPN $P_1$ all detect two separate chairs, as shown in 7103, 7102, and 7101.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present disclosure described herein may be implemented utilizing any suitable hardware (e.g. a general purpose central processing unit and/or an application-specific integrated circuit), firmware (e.g., a field programmable gate array), software (e.g., machine readable instructions to be executed by a general purpose central processing unit and/or more specialized processing unit such as graphical processing units or vector processors), or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

Generally speaking, a deep neural network includes a plurality of neurons arranged into layers. Input data (e.g., in this case, an input image) is supplied to an input layer of neurons and an output layer in generated at a layer of output neurons. In the case of a deep neural network, more than one "hidden layer" of neurons exists between the input layer and the output layer, where, generally speaking, neurons in one layer receive inputs from a previous layer and provide their outputs to a following layer, where each neuron generates an output that is a mathematical function of the sum of the inputs it receives, such as a logistic function.

The connections between the neurons of the layers are associated with weights, where each connection is made between a transmitting neuron and a receiving neuron. The values transmitted along the connections are scaled by the weight of the connection before being supplied to the receiving neuron.

The process of training a neural network generally involves supplying the neural network with training data (e.g., sample input images and desired outputs for the sample input images) and updating the weights of the neural network until the neural network generates outputs that match or approximate the desired outputs from the sample input images. Methods of training a neural network include, for example, the backpropagation algorithm.

Training a neural network may be performed on a general purpose computer system, as described above. Furthermore, vector processors such as graphics processing units and/or vector operations on general purpose computer systems (e.g., single instruction multiple data or SIMD instructions) may also be used for training a neural network, as the training process is frequently parallelizable. In some instances, programmable hardware such as field programmable gate arrays (FPGAs) or dedicated hardware such as ASICs may be used to train a neural network. The result of the training process includes a set of weights for the connections between the layers of the neural network.

When operating a trained neural network, the weights of the connections are generally fixed to the values computed during the training process. The input data (e.g., the input image) is supplied to the input layer of neurons, which perform their computations, multiply the outputs by the trained weights, and pass the outputs to the following layers of neurons (this process may be referred to as forward propagation).

Because the weights of the connections are typically fixed, a neural network deployed in an production system will generally have its weights pre-set to the trained values. As such, a trained neural network deployed on embedded systems may generally have the weights of the neural network fixed (e.g., stored in memory) and a trained neural deployed on a FGGA may have its weights set (e.g., programmed into the connections between elements representing neurons). Similarly, an ASIC may implement a neural network using, for example, neuromorphic hardware in which the weights are set using circuit elements (e.g., resistors having resistance values in accordance with the weights).

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

While certain embodiments of the present disclosure have been illustrated and described, it is understood by those of ordinary skill in the art that certain modifications and changes can be made to the described embodiments without departing from the scope of the present disclosure as defined by the following claims, and equivalents thereof.

What is claimed is:

1. A method for detecting instances of objects in an input image, the method comprising:
   extracting a plurality of core instance features from the input image;
   calculating a plurality of feature maps at multiscale resolutions from the core instance features;
   calculating a plurality of detection boxes from the core instance features, each of the detection boxes corresponding to an object detected in the input image;
   calculating a plurality of segmentation masks for each detection box of the detection boxes at the multiscale resolutions of the feature maps;
   merging the plurality of segmentation masks at the multiscale resolutions to generate an instance mask for each object detected in the input image, the instance mask being associated with a confidence score; and
   outputting the instance masks as the detected instances of the objects in the input image.

2. The method of claim 1, wherein the plurality of core instance features are extracted by supplying the input image to a fully convolutional instance semantic segmentation network.

3. The method of claim 2, wherein the feature maps at multiscale resolutions are calculated by supplying the core instance features to a feature pyramid network.

4. The method of claim 3, wherein the feature pyramid network generates a feature map of the plurality of feature maps by:
   upsampling the core instance features from the fully convolutional instance semantic segmentation network;
   applying a convolutional kernel to a previous feature map to generate a convolved previous feature map; and
   combining the upsampled core instance features and the convolved previous feature map to generate the feature map.

5. The method of claim 4, wherein the feature pyramid network upsamples the core instance features using a nearest neighbor technique.

6. The method of claim 4, wherein the feature pyramid network upsamples the core instance features using a deconvolutional layer and an interpolation convolutional kernel.

7. The method of claim 1, wherein the merging the plurality of segmentation masks at the multiscale resolutions to generate the instance mask comprises calculating an intersection over self metric and removing instances where the intersection over self metric exceeds a threshold value.

8. The method of claim 1, wherein the detection boxes are calculated by supplying the core instance features to a region proposal network.

9. The method of claim 1, further comprising:
calculating a belonging bounding box for each pixel of the input image, each of the belonging bounding boxes specifying a bounding box position of the instance mask that the pixel belongs to;
calculating a plurality of density metrics for each pixel in the input image; and
filtering the instance masks in accordance with the density metrics to minimize a differential mask discrepancy calculated from the instance masks and the density metrics.

10. The method of claim 9, wherein the calculating the belonging bounding box for each pixel of the input image comprises calculating a four feature vector representing the belonging bounding box of the pixel, the four feature vector comprising: a topmost pixel; a bottommost pixel; a leftmost pixel; and a rightmost pixel.

11. The method of claim 9, further comprising refining the confidence scores of the instance masks by:
computing an average bounding box from the belonging bounding boxes for the object detected in the input image;
calculating an intersection over union metric between the instance mask and the average bounding box; and
scaling the confidence score of the instance mask based on the intersection over union metric.

12. The method of claim 9, wherein the filtering the instance masks in accordance with the density metrics comprises:
calculating a pixel density discrepancy for every pixel in the input image;
calculating a differential mask discrepancy for each instance mask; and
minimizing the differential mask discrepancy of a collection of surviving masks.

13. The method of claim 12, wherein the differential mask discrepancy of the collection of surviving masks is minimized using a greedy search by iteratively toggling a survival status of the instance mask with larger differential mask discrepancy to update the collection of surviving masks until the differential mask discrepancy is minimized.

14. A system for detecting instances of objects in an input image, the system comprising:
a core instance feature extraction network configured to generate a plurality of core instance features from the input image;
a multiscale resolution feature map calculator configured to calculate a plurality of feature maps at multiscale resolutions from the core instance features;
a detection box calculator configured to calculate a plurality of detection boxes from the core instance features, each of the detection boxes corresponding to an object detected in the image;
a segmentation mask prediction network configured to calculate a plurality of segmentation masks for each detection box of the detection boxes at the multiscale resolutions of the feature maps;
a pyramid segmentation network configured to merge the plurality of segmentation masks at the multiscale resolutions to generate an instance mask for each object detected in the input image, the instance mask being associated with a confidence score; and
an output module configured to output the instance masks as the detected instances of the objects in the input image.

15. The system of claim 14, wherein the core instance feature extraction network comprises a fully convolutional instance semantic segmentation network.

16. The system of claim 15, wherein the multiscale resolution feature map calculator comprises a feature pyramid network.

17. The system of claim 16, wherein the feature pyramid network is configured to generate a feature map of the plurality of feature maps by:
upsampling the core instance features from the fully convolutional instance semantic segmentation network;
applying a convolutional kernel to a previous feature map to generate a convolved previous feature map; and
combining the upsampled core instance features and the convolved previous feature map to generate the feature map.

18. The system of claim 17, wherein the feature pyramid network is configured to upsample the core instance features using a nearest neighbor technique.

19. The system of claim 17, wherein the feature pyramid network is configured to upsample the core instance features using a deconvolutional layer and an interpolation convolutional kernel.

20. The system of claim 14, wherein the pyramid segmentation network is configured to merge the plurality of segmentation masks at the multiscale resolutions to generate the instance mask by calculating an intersection over self metric and removing instances where the intersection over self metric exceeds a threshold value.

21. The system of claim 14, wherein the detection box calculator comprises a region proposal network (RPN).

22. The system of claim 14, further comprising:
a belonging bounding box prediction network configured to calculate a belonging bounding box for each pixel of the input image, each of the belonging bounding boxes specifying a bounding box position of the instance mask that the pixel belongs to;
a density prediction network configured to calculate a plurality of density metrics for each pixel in the input image; and
a density based filtering module configured to filter the instance masks in accordance with the density metrics to minimize a differential mask discrepancy calculated from the instance masks and the density metrics.

23. The system of claim 22, wherein the belonging bounding box prediction network is configured to calculate the belonging bounding box for each pixel of the input image by calculating a four feature vector representing the belonging bounding box of the pixel, the four feature vector comprising: a topmost pixel; a bottommost pixel; a leftmost pixel; and a rightmost pixel.

24. The system of claim 22, further comprising a region proposal network (RPN) based score refinement module configured to refine the confidence scores of the instance masks by:
computing an average bounding box from the belonging bounding boxes for the object detected in the input image;
calculating an intersection over union metric between the instance mask and the average bounding box; and scaling the confidence score of the instance mask based on the intersection over union metric.

25. The system of claim 22, wherein the density based filtering module is configured to filter the instance masks in accordance with the density metrics by:
    calculating a pixel density discrepancy for every pixel in the input image;
    calculating a differential mask discrepancy for each instance mask; and
    minimizing the differential mask discrepancy of a collection of surviving masks.

26. The system of claim 25, wherein the differential mask discrepancy of the collection of surviving masks is minimized using a greedy search by iteratively toggling a survival status of the instance mask with larger differential mask discrepancy to update the collection of surviving masks until the differential mask discrepancy is minimized.

* * * * *